US012293360B2

(12) United States Patent
Narayanam et al.

(10) Patent No.: US 12,293,360 B2
(45) Date of Patent: May 6, 2025

(54) BLOCKCHAIN LEDGER ROLLBACK

(71) Applicant: International Business Machines Corporation, Armonk, NY (US)

(72) Inventors: Krishnasuri Narayanam, Bangalore (IN); Vinayaka Pandit, Bangalore (IN); Sandeep Nishad, Bangalore (IN); Venkatraman Ramakrishna, Bangalore (IN); Dhinakaran Vinayagamurthy, Erode (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 18/112,038

(22) Filed: Feb. 21, 2023

(65) Prior Publication Data

US 2024/0281804 A1    Aug. 22, 2024

(51) Int. Cl.
G06Q 20/38         (2012.01)

(52) U.S. Cl.
CPC ....... G06Q 20/389 (2013.01); *G06Q 2220/00* (2013.01)

(58) Field of Classification Search
None
See application file for complete search history.

(56) References Cited

U.S. PATENT DOCUMENTS

| 2005/0131782 | A1* | 6/2005 | Thuneby | G06Q 40/00 705/30 |
| 2017/0213209 | A1* | 7/2017 | Dillenberger | G06F 16/2322 |
| 2019/0050855 | A1* | 2/2019 | Martino | G06F 16/182 |
| 2019/0229892 | A1* | 7/2019 | Jevans | H04L 9/3297 |
| 2020/0145221 | A1* | 5/2020 | Chao | H04L 63/123 |

(Continued)

FOREIGN PATENT DOCUMENTS

| CN | 111258986 | A | 6/2020 |
| CN | 112200573 | A | 1/2021 |
| CN | 113064759 | A | 7/2021 |

OTHER PUBLICATIONS

Bentley II et al., When good blocks go bad: Managing unwanted blockchain data, Elsevier, International Journal of Information Management 57, all pages, retrieved from the internet: https://www.sciencedirect.com/science/article/pii/S0268401220314626, . (Year: 2021).*

(Continued)

*Primary Examiner* — Paul S Schwarzenberg
(74) *Attorney, Agent, or Firm* — Scully, Scott, Murphy & Presser, P.C.; Jared Chaney (57) ABSTRACT

A group of transactions to be rolled back in a blockchain ledger can be identified. Whether the transactions in the group are eligible to be rolled back together can be determined. Other transactions can be recommended, and the other transactions may be added to the group to be rolled back together. A rollback transaction can be added to the blockchain ledger that rolls back effect of the transactions, where the rollback transaction has zero or more inputs and zero or more output, the rollback transaction having at least one selected from at least one input and at least one output. An unspent output of a transaction in the group is provided as an input of the rollback transaction. Input of a transaction in the group, that is not an output of another transaction in the group, is provided as an output of the rollback transaction.

17 Claims, 8 Drawing Sheets

(56) References Cited

U.S. PATENT DOCUMENTS

| | | | |
|---|---|---|---|
| 2020/0167243 A1* | 5/2020 | Rauh | H04L 67/1097 |
| 2020/0387395 A1* | 12/2020 | Viale | H04L 9/50 |
| 2022/0069977 A1* | 3/2022 | Manevich | H04L 9/32 |
| 2023/0004970 A1* | 1/2023 | Jakobsson | G06Q 20/407 |

OTHER PUBLICATIONS

Brandenburger et al., Trusted Computing meets Blockchain: Rollback Attacks and a Solution for Hyperledger Fabric, 2019 38th Symposium on Reliable Distributed Systems (SRDS), retrieved from the internet: https://ieeexplore.ieee.org/stamp/stamp.jsp?tp=&arnumber=9049585, (Year: 2019).*

Debreczeni et al., Transaction Conflict Control in Hyperledger Fabric: A Taxonomy, Gaps, and Design for Conflict Prevention, Budapest University of Technology and Economics, all pages, retrieved from the internet: https://ieeexplore.ieee.org/stamp/stamp.jsp?arnumber=10418209, 4 (Year: 2024).*

Innocenti, M., "Introducing Atomic Cross-Channel Updates in Oracle Blockchain", https://blogs.oracle.com/blockchain/post/introducing-atomic-cross-channel-updates-in-oracle-blockchain, Oct. 11, 2022, 9 pages.

Atenies, G., et al., "Redactable Blockchain—or—Rewriting History in Bitcoin and Friends", 2017 IEEE European Symposium on Security and Privacy, Apr. 2017, pp. 111-126.

Peng, C., et al., "Redactable Blockchain with Fine-Grained Autonomy and Transaction Rollback", SciSec 2022: Science of Cyber Security, Sep. 30, 2022, pp. 68-84, LNCS vol. 13580.

* cited by examiner

BLOCKCHAIN LEDGER ROLLBACK

BACKGROUND

The present application relates generally to computers and computer applications, and more particularly to rolling back computer transactions such as blockchain ledger transactions.

BRIEF SUMMARY

The summary of the disclosure is given to aid understanding of a computer system and method of rolling back computer transactions, for example, blockchain ledger transactions, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include identifying a group of transactions to be rolled back in a blockchain ledger. The method can also include determining whether the transactions in the group are eligible to be rolled back together. The method can further include, responsive to determining that the transactions in the group are not eligible, recommending other transactions to be added to the group and adding the other transactions to the group to be rolled back with the transactions in the group. The method can also include adding a rollback transaction to the blockchain ledger that rolls back the effect of the group of transactions. In an aspect, the rollback transaction can have zero or more inputs and zero or more output, where the rollback transaction has at least one input or one output. An unspent output of a transaction in the group can be provided as an input of the rollback transaction. Input of a transaction in the group that is not an output of another transaction in the group can be provided as an output of the rollback transaction.

A system in an aspect can include a processor. The system can also include a memory device coupled to the processor. The processor can be configured to identify a group of transactions to be rolled back in a blockchain ledger. The processor can also be configured to determine whether the transactions in the group are eligible to be rolled back together. The processor can also be configured to, responsive to determining that the transactions in the group are not eligible, recommend other transactions to be added to the group and add the other transactions to the group to be rolled back with the transactions in the group. The processor can also be configured to add a rollback transaction to the blockchain ledger that rolls back effect of the group of transactions. In an aspect, the rollback transaction can have zero or more inputs and zero or more output, where the rollback transaction has at least one input or one output. An unspent output of a transaction in the group can be provided as an input of the rollback transaction. Input of a transaction in the group that is not an output of another transaction in the group can be provided as an output of the rollback transaction.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
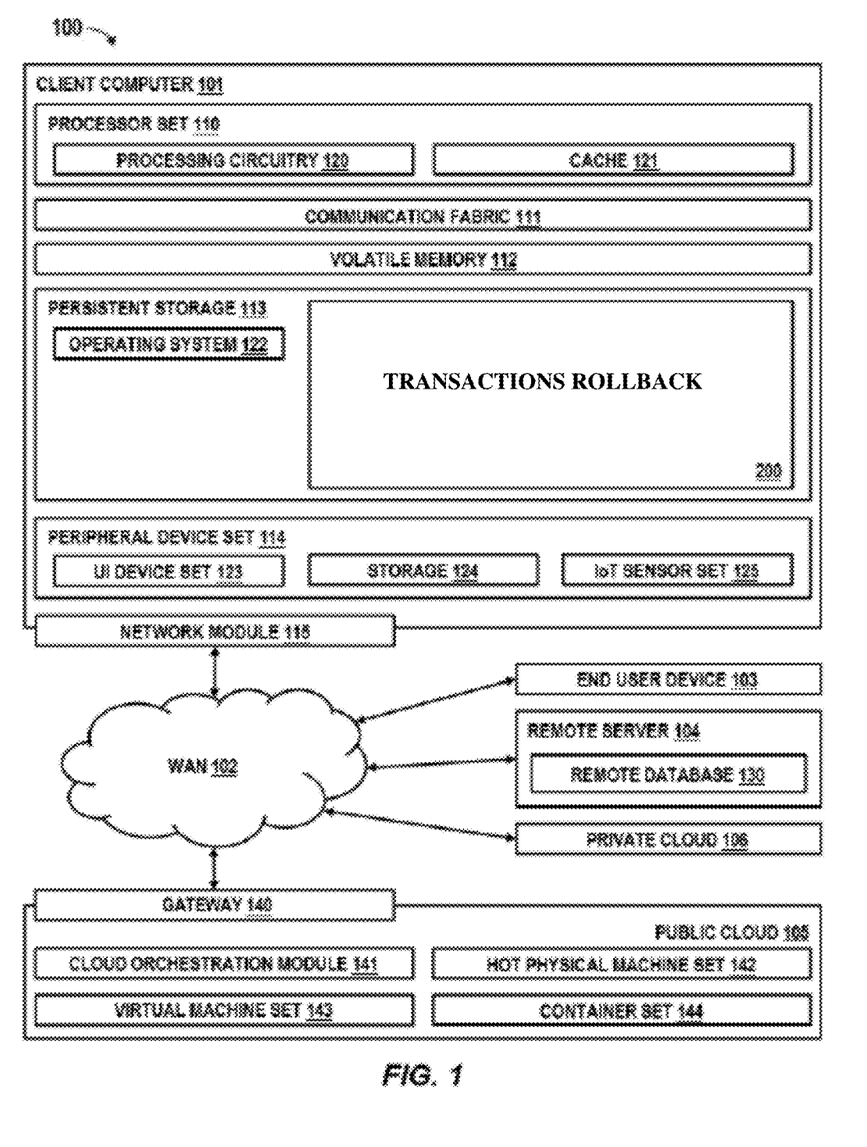
FIG. 1 shows an example of a computing environment, which can implement rollback transaction in an embodiment.

Computing environment 100 contains an example of an environment for the execution of at least some of the computer code involved in performing the inventive methods, such as rolling back of transactions algorithm or computer code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer transaction rollback operation (also referred to as rollback operation or rollback) returns a state of a computer or database to some earlier state. For example, referring to computer database systems, rollbacks can help restore integrity of the database, and also help to recover (restoring to a consistent state) from events such as database server faults, hardware faults, and/or the like, by rolling back the transactions that were active at the time of failure.

Database transaction logs can be useful to restore the database to a consistent state following such server faults.

Blockchain ledger is immutable in nature. Hence, changes once added to the ledger cannot be undone. Consider that a blockchain is interoperating with a traditional database as part of a computer system workflow. If the database faults in between, it can roll back to a historic consistent state present before the start of the workflow. However, the blockchain ledger generally cannot be rolled back to a historic consistent state present before the start of the workflow due to immutability.

In one or more embodiments, a system, method and/or technique can be provided that emulate a database rollback on a blockchain ledger. The blockchain transactions up to some historic timeline can be undone, for example, in a transaction including indivisible and irreducible series of database operations such that either all occurs, or nothing occurs, such that the transaction generates a final state which looks like a historical (rolled back) state. In performing the emulation, consent is requested and/or obtained from each party that is part of the blockchain transactions.

In an aspect, the system, method and/or technique can help in scenarios where blockchain ledger rollbacks are needed in interacting with legacy database servers. For instance, database servers might fail and recover by rolling back transactions that were active at the time of failure, necessitating rollback of a blockchain ledger that they are interacting with as well. For example, a workflow may involve a blockchain to interact with a database. Operations are carried out on blockchain ledger and database in an interleaved manner. If the database faults in between, it is possible to roll back the database to a state that is present before the start of the workflow. In such cases, any blockchain ledger operations performed during the session may need to be rolled back as well. In another aspect, for example, a blockchain platform incorporating the system, method and/or technique, may prevent completion of cross-chain swaps that are identified as not adhering to compliance checks during their course of progress by authorities. The system, method and/or technique allow the effect of one or more transactions to be rolled back on the ledger. The system, method and/or technique allow the rollback only if all the parties, who are part of one or more of the group of transactions to be rolled back, provide their consents/signatures.

Figure 2:
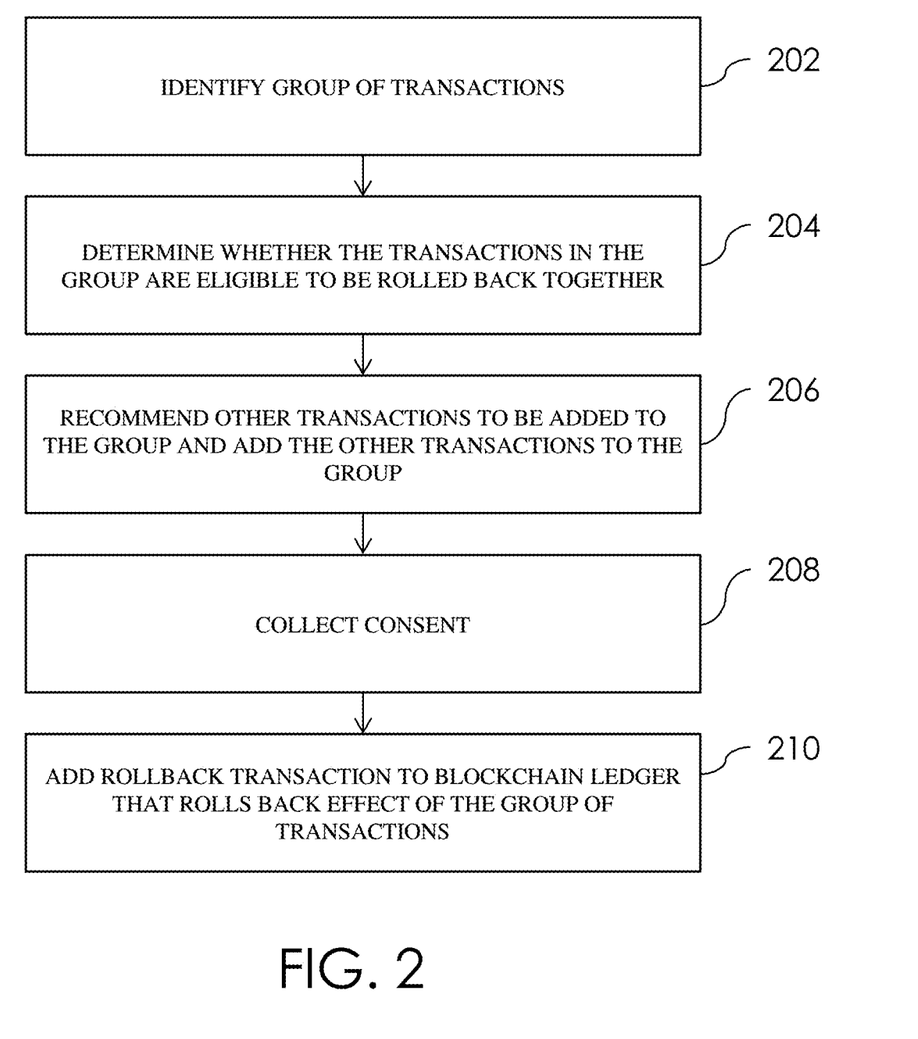
FIG. 2 is a flow diagram illustrating a method in an embodiment.

FIG. 2 is a flow diagram illustrating a method in an embodiment. The method can be implemented by and/or run on one or more processors in the computer environment described above with reference to FIG. 1. The method implements a blockchain methodology that considers a group of ledger transactions and rolls back their effect on the ledger by adding a new transaction to the ledger. At 202, a group of transactions to be rolled back is identified. For example, this can be done by receiving as input a timestamp after which transactions that occurred are to be undone or rolled back. The transactions that occurred after the timestamp can be identified, for instance, based on logs such as historical logs of ledger transactions of blockchain platform, for example, stored on a memory device or storage device. As another example, the transactions identifiers or names for identifying the group of transactions to be rolled back. In an embodiment, the group of transactions need not be transactions that occurred consecutively in time, for example, one after another. For instance, a subset of transactions can be selected among the total number of transactions occurring between the timestamp (time to which to roll back) and the current time.

At 204, the method determines whether the transactions of the group are eligible to be rolled back together. If it is determined that the group of ledger transactions cannot be rolled back together, the method may recommend other transactions to be added to the group such that all transactions in the updated group could be rolled back together.

For instance, at 206, the method may recommend other transactions to be added to the group and add the other transactions to the group to be rolled back together with the transactions in the group.

At 208, the method also includes collecting the consent or permission from all the parties who are part of one or more of the transactions of the group that are to be rolled back, and performing the roll back responsive to receiving the consent.

At 210, the method includes adding a new transaction (referred to also as a rollback transaction) that runs with given zero or more input and zero or more output, as if the to-be-rolled back transactions did not occur. The new transaction or the rollback transaction added to the ledger has zero or more inputs and zero or more outputs, with at least one input or output. Any unspent output of a transaction in the group is provided or considered as an input of the rollback transaction. Any input of a transaction in the group, that is not an output of another transaction in the group, is considered as an output of the rollback transaction. Adding the new transaction can include running the new transaction on a computer or blockchain platform, where the new transaction given its input and/or output runs in a state as if the to-be-rolled back transactions did occur. The new transaction can be any transaction, for example, a user may run. The method feeds or provides one or more inputs and/or outputs to the new transaction, such that the effect of running the new transaction is as if the new transaction is run from the time of the rollback.

In one or more embodiments, a rollback transaction can be added to a blockchain ledger: (i) to rollback just a single transaction where this single transaction need not be the latest on the ledger; (ii) to rollback a subset of transactions where the subset of transactions may belong to different blocks (a block of a blockchain); and/or (iii) to rollback all transactions up to any given historic time.

Determining or checking at 204 the eligibility of a group of transactions to be rolled back together can include the following. Input to the determining can include a group of transactions, for example, in this scenario, the identified group of transactions. For each transaction, the method can ensure that any of its outputs is: i. either not yet spent; or ii. spent by a transaction that is part of this group. If that condition holds for all the transactions of the group, those transactions are eligible to be rolled back together.

Finding the transactions to be added to a group for rolling back together for recommending at 206 can include the following. Initialize the set TO-BE-ADDED transactions to empty (i.e., { }). Construct a DAG of transactions from the input group of transactions and (union) the set TO-BE-ADDED. Transactions form the nodes of the DAG. If a transaction output is spent by another transaction, add a dependency edge between the nodes corresponding to these transactions. For each transaction in the DAG, if any of its outputs are spent by a transaction not part of the DAG, then include that transaction not part of the DAG to the set TO-BE-ADDED and repeat from the step of construction a DAG. For example, construct a node for the added transaction in the DAG. Output the transactions part of TO-BE-ADDED as the set of transactions that are to be added to the input group of transaction for the rollback to happen.

For instance, recommending other transactions to be added to the group can include initializing a to-be-added transaction set to empty. A directed acyclic graph can be constructed of the transactions in the group and those in the to-be-added transaction set (which is initially empty but can grow), where a transaction forms a node of the directed acyclic graph, and where the transaction's output spent by another transaction forms an edge between the transaction and that another transaction. Responsive to determining that the transaction represented in the node of the directed acyclic graph has output spent by a transaction not represented in the acyclic graph, that transaction not represented in the acyclic graph can be added to the to-be-added transaction set, the constructing of the directed acyclic graph can be repeated until there are no more transactions in directed acyclic graph whose output is spent by a transaction not represented in the acyclic graph. One or more transactions added to the to-be-added transaction set are recommended.

Figure 3:
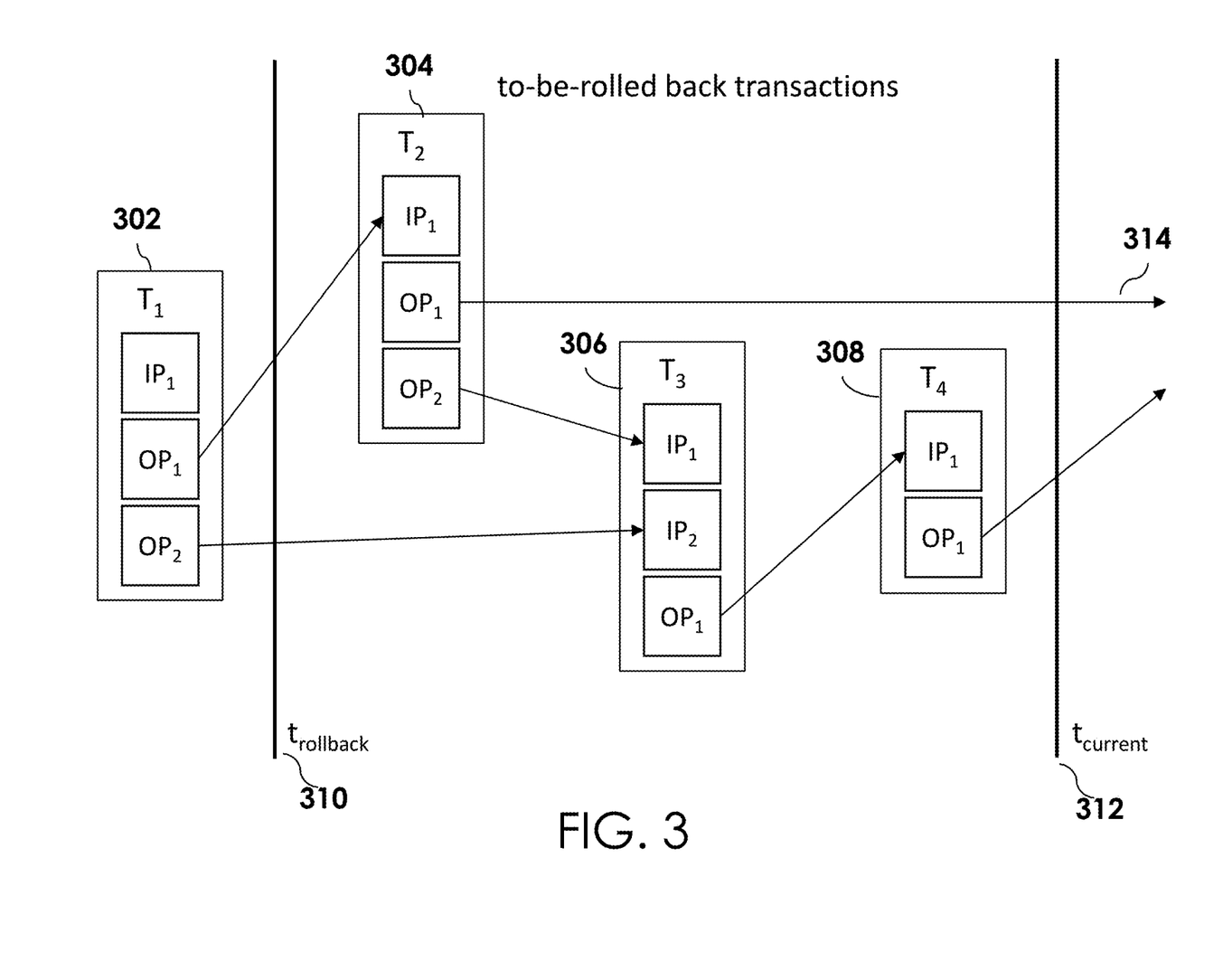
FIG. 3 shows example transactions in an embodiment where rollbacks may be performed.

FIG. 3 shows example transactions in an embodiment. Example transactions 302, 304, 306, 308 include blockchain ledger transactions or operations. For instance, consider that the transactions 302, 304, 306, 308 have been performed up to the time, t-current, shown at 312. All the transactions {T2, T3, T4} 304, 306, 308 between the timelines t-rollback 310 and t-current 312 are to be undone. These transactions form a directed acyclic graph (DAG) where input of a transaction is output of one of its predecessor transactions. For example, input IP1 of T4 308 is output OP1 of its predecessor T3 306. Inputs to some of these transactions can be outputs of transactions that happened before t-rollback. For example, input IP2 of T3 306 is output OP2 of T1 302 that is not part of the to-be-rolled back transactions. Outputs of some of these transactions can be unspent (e.g., unused) till t-current. For example, output OP1 of T2 304 is not an input to any other to-be-rolled back transactions, e.g., as shown at 314.

Figure 4:
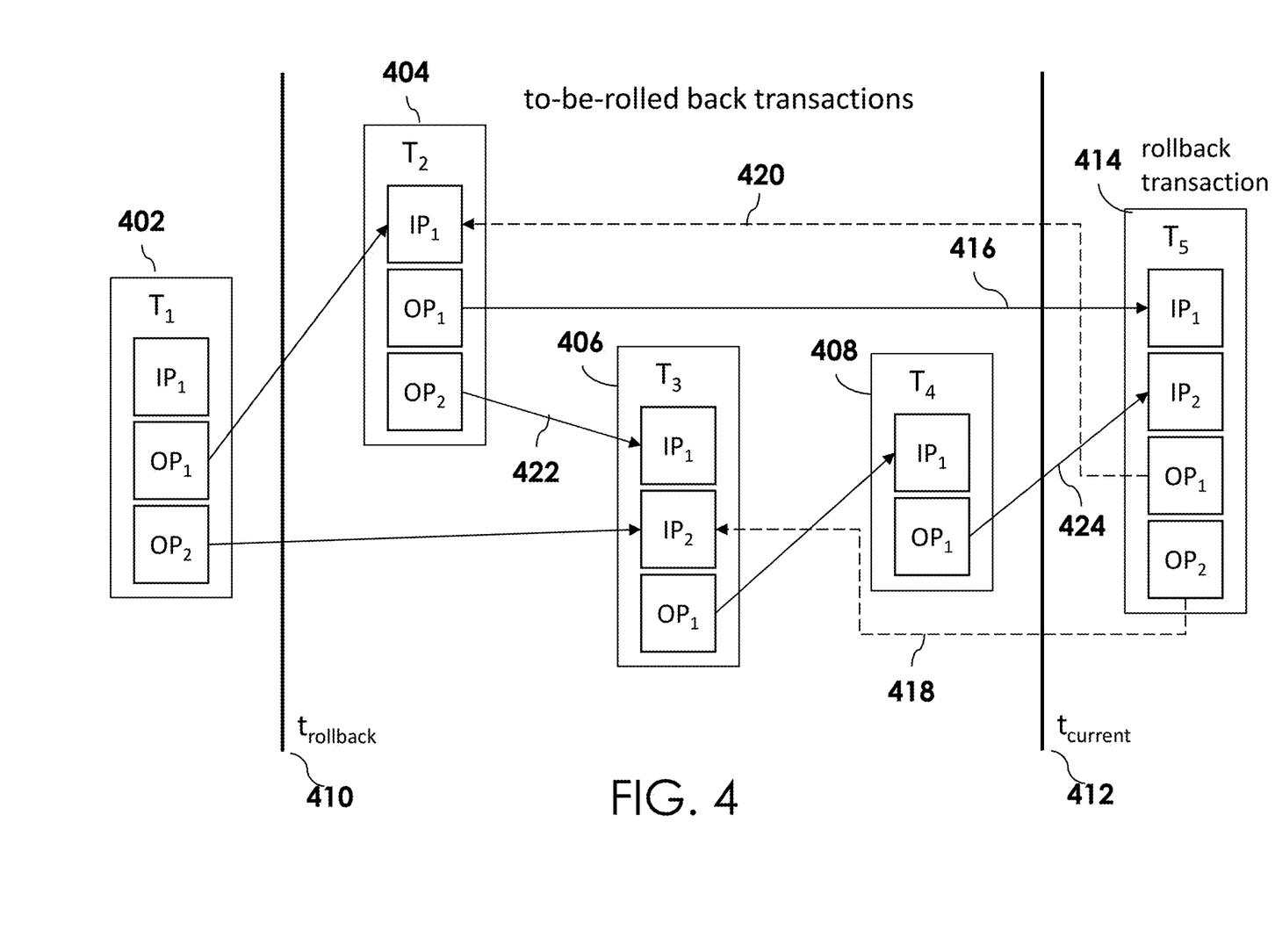
FIG. 4 shows another example of transaction where rollbacks may be performed, in an embodiment.

FIG. 4 shows another example of transaction where rollbacks may be performed, in an embodiment. Transaction T5 414 is the rollback of the transactions {T2, T3, T4} 404, 406, 408 that happened between timelines t-rollback 410 and t-current 412. A rollback transaction (e.g., shown at 414) is a transaction that would have an effect of rolling back the to-be-rolled back transactions, that is as if those to-be-rolled back transactions did not occur. Unspent outputs of to-be-rolled back transactions become inputs to the rollback transaction. For example, output OP1 of T2 404 is input IP1 of T5 414, as shown at 416; similarly, output OP1 of T4 408 is input IP2 of T5 414 as shown at 424. Inputs to the to-be-rolled back transactions, which are outputs of transactions that happened before t-rollback, become outputs of the rollback transaction. For example, input IP2 of T3 406 (i.e., output OP2 of T1 402) is output OP2 of T5 414 as shown at 418; similarly, input IP1 of T2 424 (i.e., output OP1 of T1 402) is output OP1 of T5 414 shown at 420.

The system, method and/or technique, for example, creates inputs and outputs for the next ledger transaction, for example, as if the to-be-rolled back transactions have not occurred. For instance, ledger transactions before rollback would include transactions: <T1, T2, T3, T4>, and ledger transactions after rollback would include transactions: <T1, T2, T3, T4, T5>. Impact of ledger transactions before rollback would look like the transactions <T1, T2, T3, T4> were performed. Impact of ledger transactions after rollback would look like only <T1> has happened or occurred, up to the current time (t-current 412). For example, T5 would be performed using input and output values, which would result in looking like transactions <T1, T2, T3, T4> did not occur before T5.

Any unspent output of a transaction in the group to be rolled back is considered an input of the rollback transaction. For example, OP1 of T2 404 is unspent, hence it is an input to rollback-transaction (e.g., T5 414) as shown at 416. As another example, OP2 of T2 404 is spent by T3 406, hence it is not an input to rollback-transaction 414.

Any input of a transaction in the group to be rolled back, that is not an output of another transaction in the group, is considered as an output of the rollback transaction. For example, IP1 of T3 406 is an output OP2 of T2 404 as shown at 422, which is in the to-be rolled back group, hence it is not an output of rollback transaction 414. IP2 of T3 406 is an output OP2 of T1 402, which is not in the to-be rolled back group, hence it is an output of rollback transaction 414.

Figure 5:
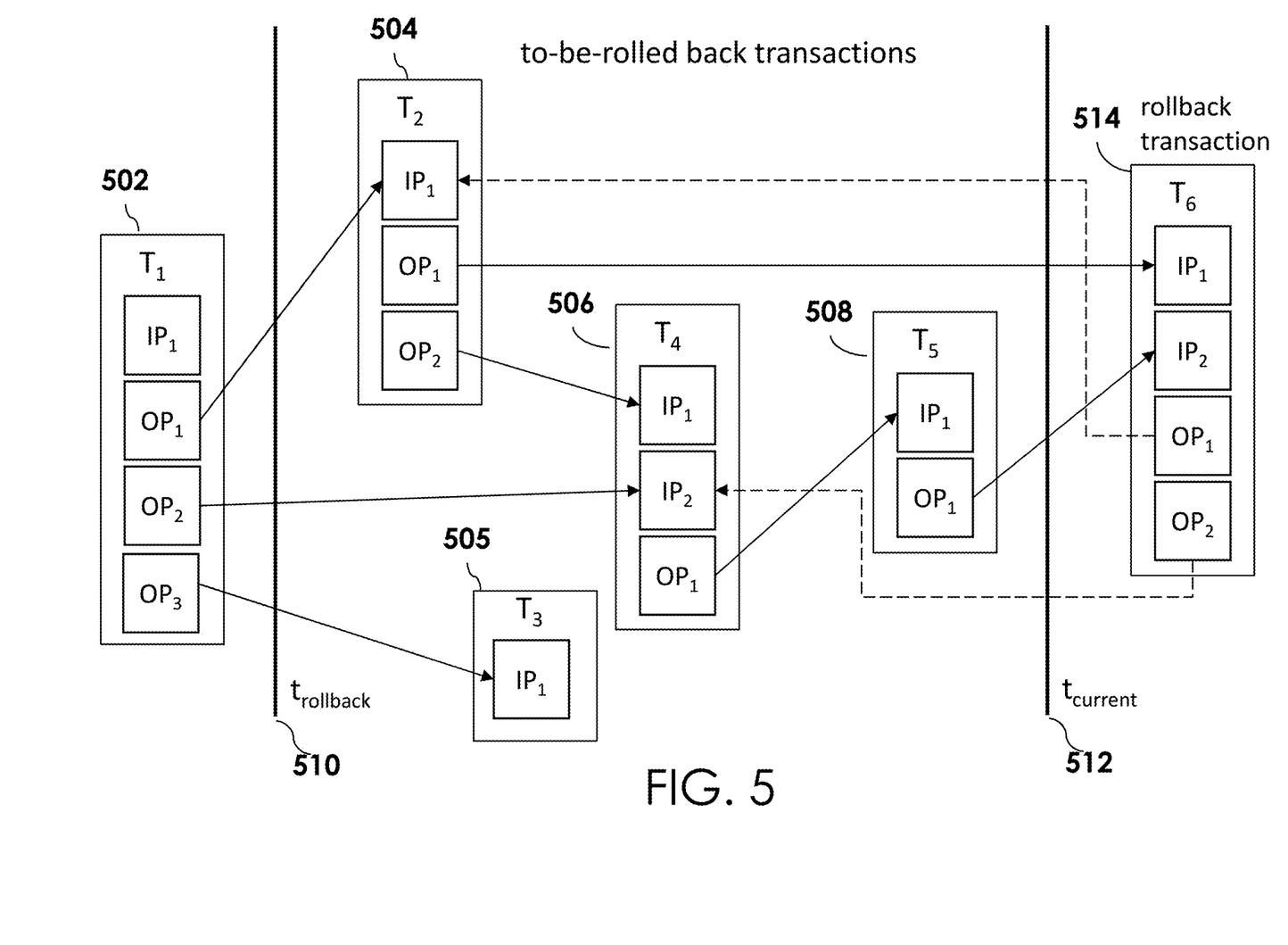
FIG. 5 is a diagram showing an example of a group of selective transactions rolling back in an embodiment.

FIG. 5 is a diagram showing an example of a group of selective transactions rolling back in an embodiment. In this diagram, a transaction that occurred before the t-rollback 510 includes T1 502. To-be-rolled back transactions include T2 504, T4 506 and T5 508. T-current is shown at 512, which represents the time or current time, up to which time rollbacks are to occur. Rollback transaction is shown at 514. Consider that transaction T3 505 happened after T2 504 and before T4 506. Rollback of the transactions {T2, T4, T5} is eligible and can be carried out via transaction T6, hence, for example, selectively rolling back transactions from the group of transactions occurring between t-rollback 510 and t-current 512. In contrast, a traditional database cannot allow a subset of transactions to rollback. For example, {T2, T4, T5} generally cannot be rolled back without including T3 to the to-be-rolled back transactions in the case of a database.

In one or more embodiments, the method, system and/or technique can perform, based on meeting one or more criteria for each scenario, one or more of rolling back a transaction, which is not necessarily the latest transaction on the ledger, selectively roll back a group of transactions together, which are not necessarily consecutively occurring and also rollback the ledger to a specific point in time. For instance, in an embodiment, the method, system and/or technique can roll back a transaction, which is not necessarily the latest on the ledger, but whose output or outputs is or are not yet spent. In another embodiment, the method, system and/or technique can roll back a group of transactions together. The transactions in the group to be rolled back together need not necessarily be consecutively occurring in time transactions, for example, one after another. The method, system and/or technique can perform an eligibility check to determine the transactions of the group that are eligible to be rolled back together, for example, even if they are separated by a transaction that is not-to-be rolled back. Yet in another embodiment, the method, system and/or technique can perform a ledger rollback to a specific point in time (e.g., a given timestamp). For instance, the method, system and/or technique can roll back together all the transaction that happened after input or given timestamp.

In an embodiment, the method, system and/or technique can be implemented in distributed ledger technologies with unspent transaction output (UTXO) ledger model. The method, system and/or technique can help one or more blockchain systems interoperate with legacy database servers, where rollbacks often occur. Ledger-rollback functionality can be provided to any blockchain user as a primitive platform capability, providing a differentiator in terms of the functionalities offered by a blockchain platform.

Figure 6:
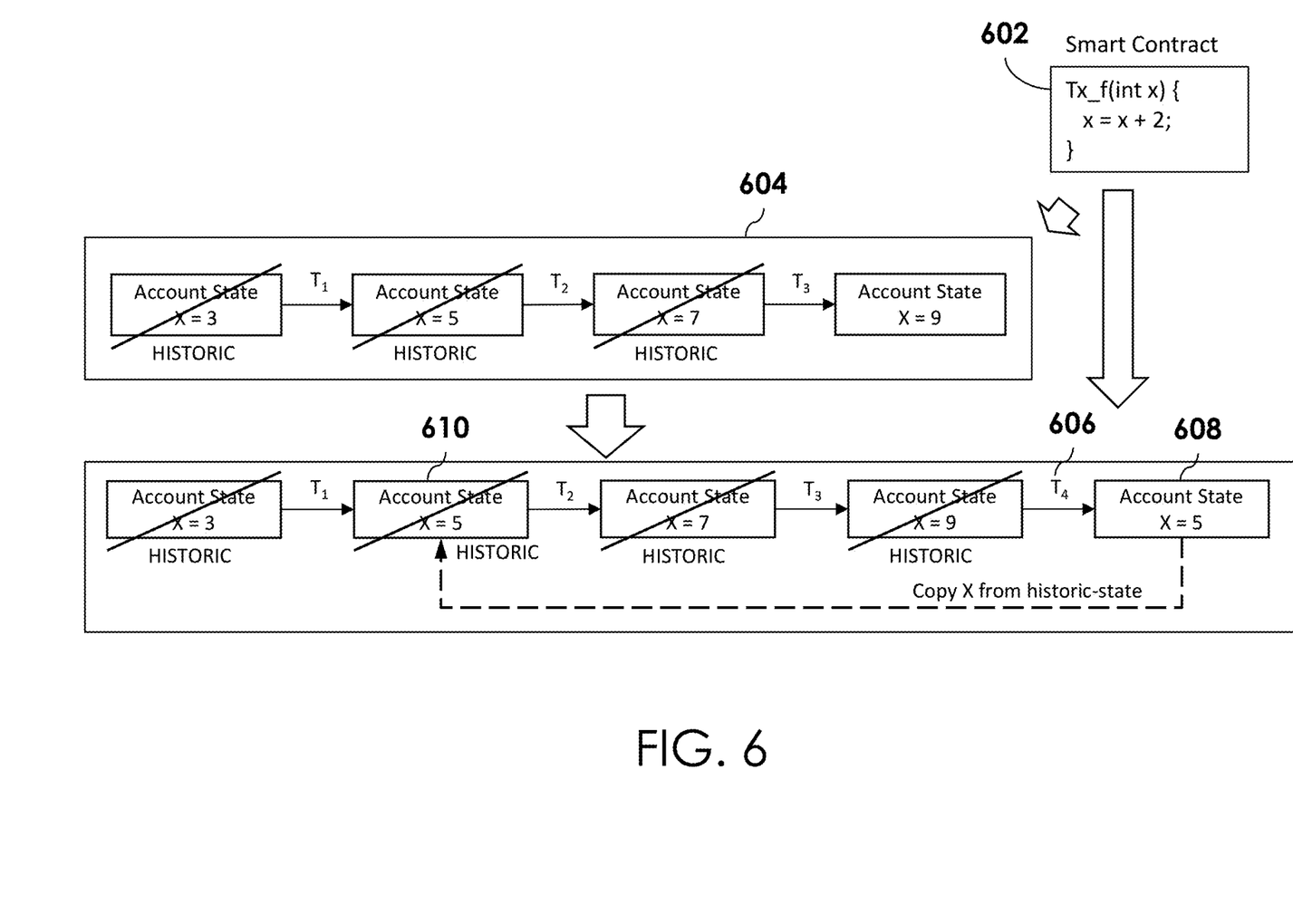
FIG. 6 is another example of showing a rollback of transactions in an embodiment.

FIG. 6 is another example of showing a rollback of transactions, which can be performed on a blockchain platform in an embodiment. Consider a smart contract transaction which includes the transaction shown at 602, e.g., Tx_f (int x) is defined as {x=x+2}. Let T1=Tx_f(x), T2=Tx_f(x), and T3=Tx_f(x), where Tx_f( ) is the smart contract defined at 602. Transactions T1, T2, T3 performed on a blockchain platform are shown at 604. For instance, after T1, X=5, after T2, X=7, after T3, X=7. Consider that T2 and T3 are rolled back. T4 606 is the rollback transaction of committed ledger transactions up to T2 610 (i.e., rollback of {T2, T3} representing that T2 and T3 are to be rolled back). Input for a roll back request can be: "transaction ID" corresponding to T2 up to which the transactions need to be rolled back. Output of the roll back request can be: state created with value of X same as the value of X in the input state of T2 in vault. T4=rollback of {T2, T3}. For instance, transaction T4 is created, in which X becomes 5 as shown at 608, e.g., rolling back the state to transaction before T2 as shown at 610. For instance, in an example implementation, transactions can be navigated using flows with user-defined or built-in functionalities such as GetTransactionBackChain and get the input and/or output states corresponding to all the transactions part of the rollback set. For instance, inputs and/or output states can be navigated back along T3 and T2 to the state before T2, e.g., shown at 610. The input value, e.g., X, can be copied from that historic state.

Figure 7:
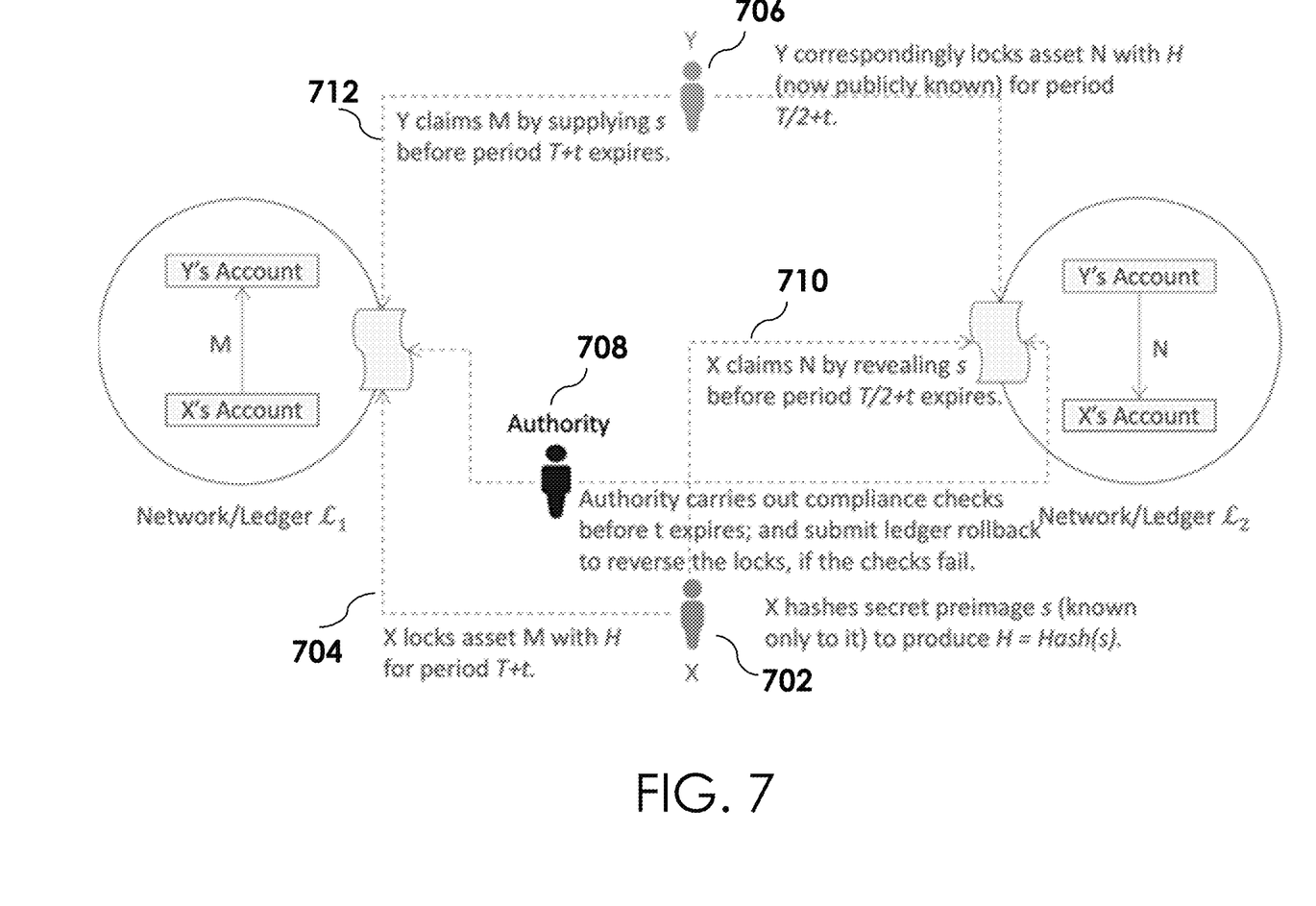
FIG. 7 is a diagram illustrating a use case scenario in an embodiment.

In one or more embodiments the transactions that effect a rollback described herein operate as a unit or unitary function, for example, with all of the transactions happening or none of the transactions happening. FIG. 7 is a diagram illustrating a use case scenario in an embodiment. The example use case describes compliance checking during cross-chain swaps. For example, auditing of cross-chain swaps may be performed to know the transaction participants' adherence to regulatory guidelines. However, auditing may not prevent the occurrence of an irregular transaction as such. It would be helpful if there exists a mechanism to prevent the occurrence of irregular transactions in the first place for compliance. An example of regulatory compliance violations by asset swap participants may include exceeding the number of allowed asset swaps by a party in a period. Upon stopping of a non-compliant swap, the participants should get access to their initial assets at the earliest opportunity.

A hashed timelock contract (HTLC) can be used for cross-chain swaps. HTLC can include three protocol phases: Lock phase, in which swap participants perform locking of assets in different ledgers; Claim phase, in which swap participants perform claiming of assets that were locked earlier; and Unlock phase, in which swap participants reclaim their respective locked assets if the swap could not happen. In an embodiment, a method, system and/or technique can provide an additional phase "compliance check" before the claim phase and after the lock phase. For instance, a compliance check phase can include the following. If the compliance checks pass, then participants can proceed with claim phase. If the compliance checks fail, then the locks are rolled back, and the participants get back access to their locked assets instantly. In an aspect, only those that are authorized to carry out compliance can perform this action.

At 702. X hashes secret preimage s (known only to it) to produce H=Hash(s). At 704, X locks asset M with H for period T+t. Period T represents the time configured or set for the completion of the cross-chain asset swap workflow. Generally, it can be in the order of few hours to days. The parties X and Y involved in the asset swap can decide this time period. The time period t can also be a reserved period in the order of few hours to days for the regulatory authorities to carry out the compliance checks on the asset swap transaction. The time period t can be configured or preconfigured, for example, by one or more parties or the regulatory or another appropriate institution involved in the transaction. At 706, Y correspondingly locks asset N with H (now publicly known) for period T/2+t. At 708, an authority carries out compliance checks before t expires, and submits ledger rollback to reverse the locks, if the checks fail. At 710, X claims N by revealing s before period T/2+t expires, if there were no compliance violations found by the regulatory authority and there were no ledger rollback transactions submitted to reverse the locks. At 712, Y claims M by supplying s before period T+t expires. In an embodiment, compliance check may be carried out to ensure that the values of the assets M or N does not exceed a threshold limit. In another embodiment, compliance check may be carried out to ensure that parties X or Y are not involved in more than a threshold number of asset swap transactions in each period.

Figure 8:
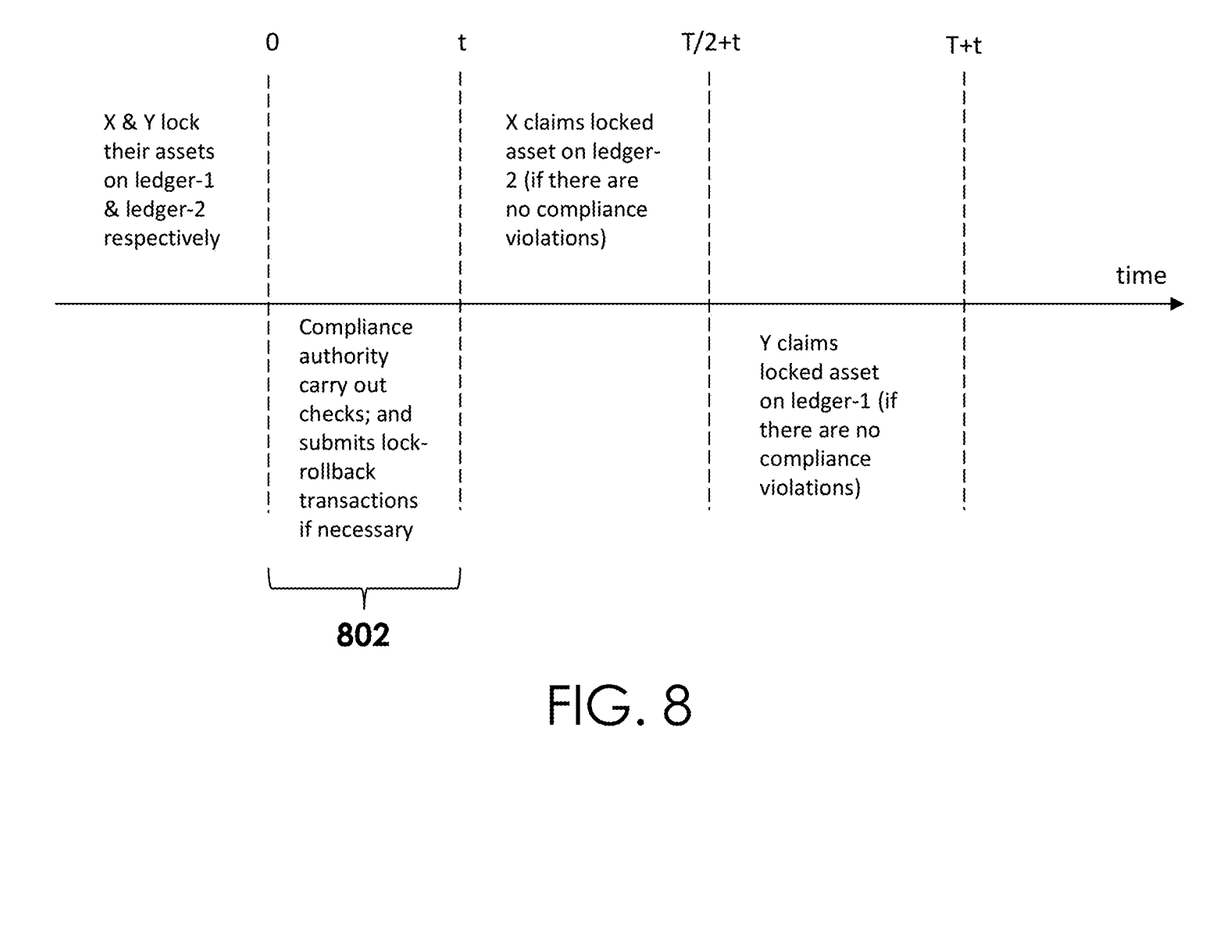
FIG. 8 is a diagram illustrating a timeline of the actions by different parties in an embodiment.

FIG. 8 is a diagram illustrating a timeline of the actions by different parties in an embodiment. At some time, for example, referred to as time 0 or another base time, X and Y lock their assets on ledger-1 and ledger-2 respectively. For example, X locks X's asset M, Y locks Y's asset N. During time 0 and t, a compliance check 802 can be carried out, and if not in compliance, rollback transactions can be performed by the authorities. If the compliance check clears, then before T/2+t time, X may claim locked asset on ledger-2. Similarly, if the compliance check clears, then before T+t. Y may claim locked asset on ledger-1. In this way, X and Y have successively swapped their assets, provided the transactions are compliance. Otherwise, rollback transactions can be performed. The cross-chain swap, for example, X and Y swapping assets, occurs as a unit operation, using the rollback described above, for example, all transactions in the swap occur or none occur. In an embodiment, the compliance phase need not be restricted to time period [0,t]. Instead, it could span anytime up to T. If there were claims already made by one party (X on ledger-2) or both parties (X on ledger-2 and Yon ledger-1), then those claims can also be undone as part of the rollback transactions submitted by the compliance authority. As described above, period T represents the time configured or set for the completion of the cross-chain asset swap workflow. Generally, it can be in the order of few hours to days. The parties X and Y involved in the asset swap can decide this time period. The time period t can also be a reserved period in the order of few hours to days for the regulatory authorities to carry out the compliance checks on the asset swap transaction, and to ensure compliance during the asset swap transaction occurrence. The time period t can be configured or preconfigured, for example, by one or more parties or the regulatory or another appropriate institution involved in the transaction.

In an aspect, an authority carries out compliance checks in both the ledgers at the same time, after the assets were locked in the respective ledgers. Compliance violations may be found with any one ledger lock transaction, or with both the ledger lock transactions. Violations may be in relation to the historic ledger transactions by the parties involved in the current asset swap. If any non-compliance is found even in one ledger, the locks performed are rolled back in both the ledgers. Compliance checks may be off-chain checks or on-chain smart contract functions invoked by the regulatory authorities. Claims by the parties can be carried out only if there are no rollback transactions by the compliance authority.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by at least one computer processor, comprising:
    identifying a group of transactions to be rolled back in a blockchain ledger;
    determining whether the transactions in the group are eligible to be rolled back together;
    responsive to determining that the transactions in the group are not eligible, recommending other transactions to be added to the group and adding the other transactions to the group to be rolled back with the transactions in the group; and
    adding a rollback transaction to the blockchain ledger that rolls back effect of the group of transactions,
    wherein the rollback transaction has zero or more inputs and zero or more output, the rollback transaction having at least one selected from at least one input and at least one output,
    wherein an unspent output of a transaction in the group is provided as an input of the rollback transaction,
    wherein input of a transaction in the group, that is not an output of another transaction in the group, is provided as an output of the rollback transaction,
    the rollback transaction rolling back the group of transactions that were active at the time of computer failure, and restoring a state of the blockchain ledger to an earlier state consistent with a rollback in a computer database system with which the blockchain ledger is interacting;
    wherein recommending other transactions to be added to the group includes:
        initializing a to-be-added transaction set to empty;
        constructing a directed acyclic graph of the transactions in the group and in the to-be-added transaction set, wherein a transaction forms a node of the directed acyclic graph, and wherein the transaction's output spent by another transaction forms an edge between the transaction and said another transaction;
        responsive to determining that the transaction represented in the node of the directed acyclic graph has output spent by a transaction not represented in the acyclic graph, adding the transaction not represented in the acyclic graph to the to-be-added transaction set and repeating the constructing the directed acyclic graph until there are no more transactions in the directed acyclic graph whose output is spent by a transaction not represented in the acyclic graph, wherein transactions added to the to-be-added transaction set are recommended.

2. The computer-implemented method of claim 1, further including collecting consent from all parties who are part of the transactions that are eligible to be rolled back together.

3. The computer-implemented method of claim 1, wherein determining of whether the transactions in the group are eligible to be rolled back together includes, for each of the transactions in the group:
    ensuring at least one of: that output of the transaction is not spent, and that the output of the transaction is spent by a transaction that is part of the group.

4. The computer-implemented method of claim 1, wherein identifying the group of transactions to be rolled back in a blockchain ledger includes receiving a timestamp representing a time back to which blockchain ledger transactions are to be rolled back, and identifying the group of transactions that occurred from the timestamp to current time.

5. The computer-implemented method of claim 1, wherein identifying the group of transactions to be rolled back in a blockchain ledger includes receiving the group of transactions, wherein the group of transactions need not be transactions that occurred consecutively in time.

6. The computer-implemented method of claim 1, wherein the group of transactions includes a single transaction wherein the single transaction need not be a latest transaction performed on the blockchain ledger.

7. A computer program product comprising a computer readable storage medium having program instructions embodied therewith, the program instructions readable by a device to cause the device to:
    identify a group of transactions to be rolled back in a blockchain ledger;
    determine whether the transactions in the group are eligible to be rolled back together;
    responsive to determining that the transactions in the group are not eligible, recommend other transactions to be added to the group and add the other transactions to the group to be rolled back with the transactions in the group; and
    add a rollback transaction to the blockchain ledger that rolls back effect of the group of transactions,
    wherein the rollback transaction has zero or more inputs and zero or more output, the rollback transaction having at least one selected from at least one input and at least one output,
    wherein an unspent output of a transaction in the group is provided as an input of the rollback transaction, wherein input of a transaction in the group, that is not an output of another transaction in the group, is provided as an output of the rollback transaction, the rollback transaction rolling back the group of transactions that were active at the time of computer failure, and restoring a state of the blockchain ledger to an earlier state consistent with a rollback in a computer database system with which the blockchain ledger is interacting, wherein in recommending other transactions to be added to the group, the device is caused to:

initialize a to-be-added transaction set to empty;

construct a directed acyclic graph of the transactions in the group and in the to-be-added transaction set, wherein a transaction forms a node of the directed acyclic graph, and wherein the transaction's output spent by another transaction forms an edge between the transaction and said another transaction;

responsive to determining that the transaction represented in the node of the directed acyclic graph has output spent by a transaction not represented in the acyclic graph, add the transaction not represented in the acyclic graph to the to-be-added transaction set and repeat constructing the directed acyclic graph until there are no more transactions in the directed acyclic graph whose output is spent by a transaction not represented in the acyclic graph, wherein transactions added to the to-be-added transaction set are recommended.

8. The computer program product of claim 7, wherein the device is further caused to collect consent from all parties who are part of the transactions that are eligible to be rolled back together.

9. The computer program product of claim 7, wherein in determining of whether the transactions in the group are eligible to be rolled back together, the device is caused to, for each of the transactions in the group:

ensure at least one of: that output of the transaction is not spent, and that the output of the transaction is spent by a transaction that is part of the group.

10. The computer program product of claim 7, wherein in identifying the group of transactions to be rolled back in a blockchain ledger, the device is caused to, receive a timestamp representing a time back to which blockchain ledger transactions are to be rolled back, and identifying the group of transactions that occurred from the timestamp to current time.

11. The computer program product of claim 7, wherein in identifying the group of transactions to be rolled back in a blockchain ledger, the device is caused to, receive the group of transactions, wherein the group of transactions need not be transactions that occurred consecutively in time.

12. The computer program product of claim 7, wherein the group of transactions includes a single transaction wherein the single transaction need not be a latest transaction performed on the blockchain ledger.

13. A system comprising:
a processor;
a memory device coupled to the processor;
the processor configured to at least:
identify a group of transactions to be rolled back in a blockchain ledger;
determine whether the transactions in the group are eligible to be rolled back together;
responsive to determining that the transactions in the group are not eligible, recommend other transactions to be added to the group and add the other transactions to the group to be rolled back with the transactions in the group; and add a rollback transaction to the blockchain ledger that rolls back effect of the group of transactions, wherein the rollback transaction has zero or more inputs and zero or more output, the rollback transaction having at least one selected from at least one input and at least one output, wherein an unspent output of a transaction in the group is provided as an input of the rollback transaction, wherein input of a transaction in the group, that is not an output of another transaction in the group, is provided as an output of the rollback transaction, the rollback transaction rolling back the group of transactions that were active at the time of computer failure, and restoring a state of the blockchain ledger to an earlier state consistent with a rollback in a computer database system with which the blockchain ledger is interacting;

wherein in recommending other transactions to be added to the group, the processor is configured to:

initialize a to-be-added transaction set to empty;

construct a directed acyclic graph of the transactions in the group and in the to-be-added transaction set, wherein a transaction forms a node of the directed acyclic graph, and wherein the transaction's output spent by another transaction forms an edge between the transaction and said another transaction;

responsive to determining that the transaction represented in the node of the directed acyclic graph has output spent by a transaction not represented in the acyclic graph, add the transaction not represented in the acyclic graph to the to-be-added transaction set and repeat constructing the directed acyclic graph until there are no more transactions in the directed acyclic graph whose output is spent by a transaction not represented in the acyclic graph, wherein transactions added to the to-be-added transaction set are recommended.

14. The system of claim 13, wherein the processor is further configured to collect consent from all parties who are part of the transactions that are eligible to be rolled back together.

15. The system of claim 13, wherein in determining of whether the transactions in the group are eligible to be rolled back together, the processor is configured to, for each of the transactions in the group:

ensure at least one of: that output of the transaction is not spent, and that the output of the transaction is spent by a transaction that is part of the group.

16. The system of claim 13, wherein in identifying the group of transactions to be rolled back in a blockchain ledger, the processor is configured to receive a timestamp representing a time back to which blockchain ledger transactions are to be rolled back, and identifying the group of transactions that occurred from the timestamp to current time.

17. The system of claim 13, wherein the group of transactions includes a single transaction wherein the single transaction need not be a latest transaction performed on the blockchain ledger.

* * * * *